United States Patent
Chen (10) Patent No.: US 12,408,117 B2
(45) Date of Patent: Sep. 2, 2025

(54) POWER CONTROL METHOD AND COMMUNICATION DEVICE THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 478 days.

(21) Appl. No.: 17/990,724

(22) Filed: Nov. 20, 2022

(65) Prior Publication Data

US 2024/0056983 A1 Feb. 15, 2024

(30) Foreign Application Priority Data

Aug. 9, 2022 (TW) .................................. 111129914

(51) Int. Cl.
  *H04W 52/24* (2009.01)
  *H04B 17/391* (2015.01)
  *H04W 52/06* (2009.01)

(52) U.S. Cl.
  CPC ........ *H04W 52/24* (2013.01); *H04B 17/3913* (2015.01); *H04W 52/06* (2013.01)

(58) Field of Classification Search
  CPC ... H04W 52/24; H04W 52/06; H04W 52/223; H04W 52/0251; H04W 52/28;
  (Continued)

(56) References Cited

U.S. PATENT DOCUMENTS 8,320,948 B2 *  11/2012  Li ....................... H04W 52/02
2013/0003636 A1 *   1/2013  Proctor ................. H04W 52/16
(Continued)

FOREIGN PATENT DOCUMENTS

CN   102368868 B  *  9/2013
CN   107295622 B      3/2020
(Continued)

OTHER PUBLICATIONS

Uryu Shinya et al., Latest Knowledge and Practice for Data Scientists, 1st Edition, Mynavi Publishing Co., Ltd. Naoki Takiguchi, Jun. 27, 2017, pp. 89-95 (Document showing well-known technology) ,Jun. 27, 2017. Abstract.

*Primary Examiner* — Lana N Le
(74) *Attorney, Agent, or Firm* — Winston Hsu (57) ABSTRACT

A power control method, for a first communication device, includes applying Bayesian Optimization, Causal Bayesian Optimization, or Dynamic Causal Bayesian Optimization to at least one data so as to determine a transmission power control value, and outputting the transmission power control value. The at least one data is extracted from at least one signal at least from a second communication device. The transmission power control value is configured to instruct the second communication device how to set the transmission power of the second communication device. Even if the second communication device moves fast, the second communication device is able to adjust its transmission power according to the optimized transmission power control value, thereby minimizing the power consumption of the second communication device.

18 Claims, 8 Drawing Sheets

(58) Field of Classification Search
CPC . H04W 52/243; H04W 52/18; H04W 52/241; H04W 24/02; H04W 28/18; H04W 28/0236; H04W 52/16; H04W 52/143; H04W 52/367; H04W 52/225; H04W 52/226; H04W 52/38; H04W 52/54; H04W 52/0209; H04W 52/228; H04W 52/34; H04W 72/02; H04W 72/0473; H04W 72/541; H04W 92/18; H04W 52/245; H04W 52/248; H04W 52/22; H04W 52/56; H04W 52/242; H04B 17/3913; H04B 17/24; H04B 17/26; H04B 17/345; H04B 7/18543

See application file for complete search history.

(56) References Cited

U.S. PATENT DOCUMENTS

| | | | |
|---|---|---|---|
| 2015/0208361 A1* | 7/2015 | Kim | H04W 52/242 455/522 |
| 2019/0261317 A1* | 8/2019 | Nammi | H04W 72/02 |
| 2022/0191798 A1* | 6/2022 | Maggi | H04W 52/24 |
| 2024/0422693 A1* | 12/2024 | Cho | H04W 52/28 |
| 2025/0062843 A1* | 2/2025 | Lin | H04B 17/3913 |

FOREIGN PATENT DOCUMENTS

| | | | |
|---|---|---|---|
| CN | 111246460 A | * | 6/2020 |
| WO | 2020/213128 A1 | | 10/2020 |

\* cited by examiner

POWER CONTROL METHOD AND COMMUNICATION DEVICE THEREOF

BACKGROUND OF THE INVENTION

1. Field of the Invention

The present invention relates to a power control method and a communication device thereof, and more particularly, to a power control method and a communication device thereof which save power consumption efficiently and precisely.

2. Description of the Prior Art

In general, closed loop power control or open loop power control may be used to determine/adjust transmission power of (a transmitter of) a communication device to minimize/optimize the power consumption of the communication device (e.g., cell phone). In the closed-loop power control, the signal-to-interference-plus-noise ratio (SINR) of a signal received from the communication device is measured, and then the SINR is compared to an SINR target value to determine how to adjust the transmission power of the communication device. The transmission power control command of the closed loop power control may be used after calculating the transmission power using the open loop power control.

The existing closed loop power control has a fixed SINR target value, and the existing closed loop power control is on a step-by-step basis (e.g., −1, 0, +1, or +3 dB per step) to increase/decrease the transmitter power of the communication device (e.g., to gradually increase/decrease the transmission power by −1, 0, +1, or +3 dB each time) in an attempt to minimize the power consumption of the communication device in the long run. However, when the communication device is moving at high speed (and the channel changes rapidly), the existing power control cannot respond in time and cannot optimally control power. Since transmission power control selection is far from optimal, lots of (battery) power of the communication device may be wasted. Therefore, there is still room for improvement when it comes to power control.

SUMMARY OF THE INVENTION

It is therefore a primary objective of the present invention to provide a power control method and a communication device thereof to save power consumption efficiently and precisely.

An embodiment of the present invention discloses a power control method, for a first communication device, includes applying Bayesian Optimization, Causal Bayesian Optimization, or Dynamic Causal Bayesian Optimization to at least one data so as to determine a transmission power control (TPC) value, and outputting the TPC value. The at least one data is extracted from at least one signal at least from a second communication device. The TPC value is configured to instruct the second communication device how to set transmission power of the second communication device.

An embodiment of the present invention discloses a communication device, comprising a storage circuit, configured to store instructions and a processing circuit, coupled to the storage device, configured to execute the instructions stored in the storage circuit. The instructions include applying Bayesian Optimization, Causal Bayesian Optimization, or Dynamic Causal Bayesian Optimization to at least one data so as to determine a transmission power control (TPC) value, and outputting the TPC value. The at least one data is extracted from at least one signal at least from a second communication device. The TPC value is configured to instruct the second communication device how to set transmission power of the second communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
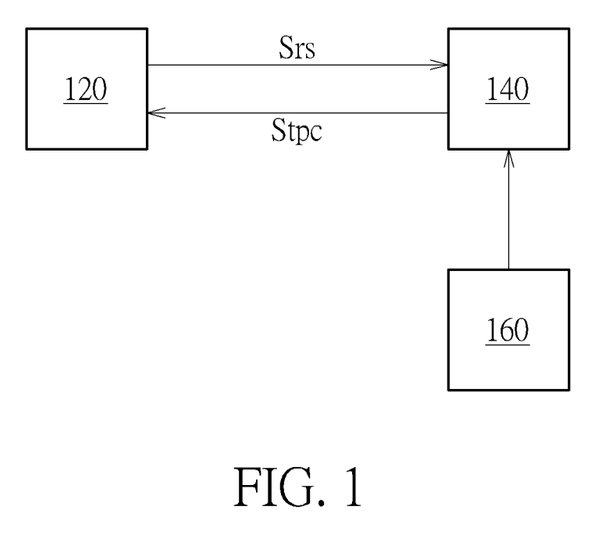
FIG. 1 is a schematic diagram of a communication system according to an embodiment of the present invention.

FIG. 1 is a schematic diagram of a communication system 10 according to an embodiment of the present invention. The communication system 10 may include communication devices 120 to 160. The communication device 120 may send a signal Srs. The signal Srs is transmitted to the communication device 140 over a medium such as air (referred to as a channel 140). The communication device 140 may estimate signal-to-interference-plus-noise ratio (SINR) of the signal Srs, and compare the SINR with an SINR target value. When the strength of the signal Srs is weak (e.g., the SINR of the signal Srs is below the SINR target value), the communication device 140 may send a transmission power control (TPC) command Stpc (e.g., to request for an increase in transmitter's power), such that the communication device 120 may increase transmission power accordingly. Otherwise, the TPC command Stpc may be used to request for a decrease in transmission power.

The communication device 140 or 160 may at least determine or optimize a TPC value and/or an SINR target value of the TPC command Stpc collectively based on an algorithm (e.g., Bayesian Optimization, Causal Bayesian Optimization, or Dynamic (Temporal) Causal Bayesian Optimization), such that even if the communication device 120 is moving fast, the communication device 120 is able to adjust its transmission power according to the minimized/optimized TPC value so as to minimize/optimize the power consumption of the communication device 120.

Take Bayesian Optimization as an example. Bayesian Optimization is a black-box optimization algorithm for solving extremum problems of functions whose expressions are unknown. For example, P(tc, s)=uef(tc, s), where P( ) may represent (a function of) the power consumption of the communication device 120, uef( ) may represent a function whose expression is unknown, and tc may represent a TPC value of the TPC command Stpc, s may represent an SINR target value. In other words, the expression of the relationship function uef( ) among the power consumption P( ), the SINR target value s, and the TPC value tc is unknown. The SINR target value s and/or the TPC value tc to minimize the power consumption P( ) may be calculated by using Bayesian Optimization. In this way, the communication device 120 may adjust its transmission power according to the TPC value tc.

Figure 2:
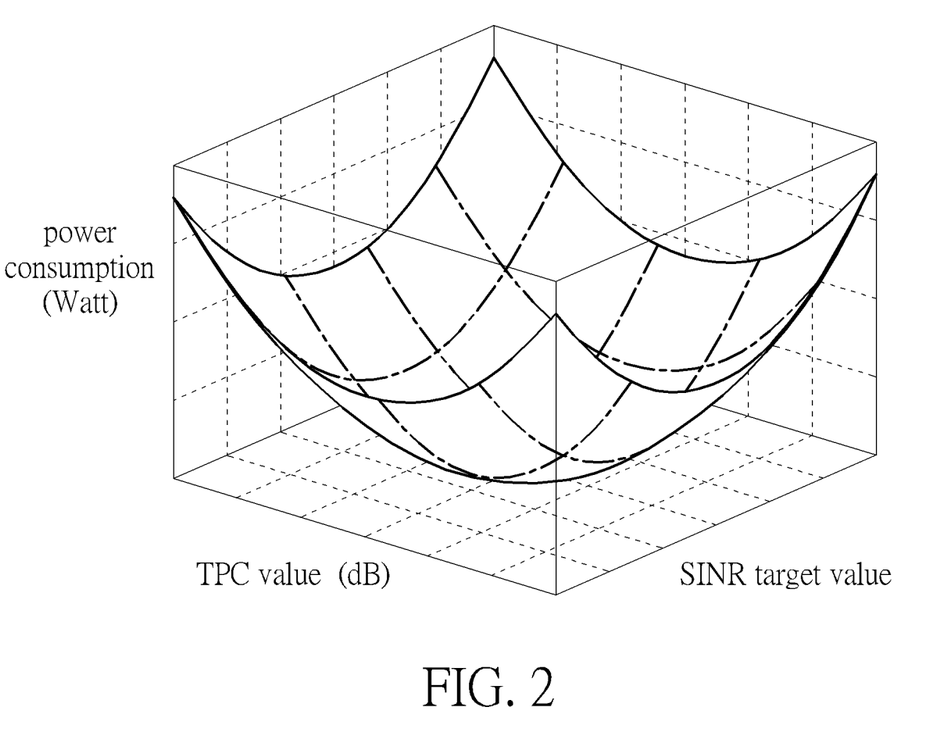
FIG. 2 is a schematic diagram of the relationship between power consumption, SINR target values, and transmission power control values of a transmission power control command according to an embodiment of the present invention.
Figure 3:
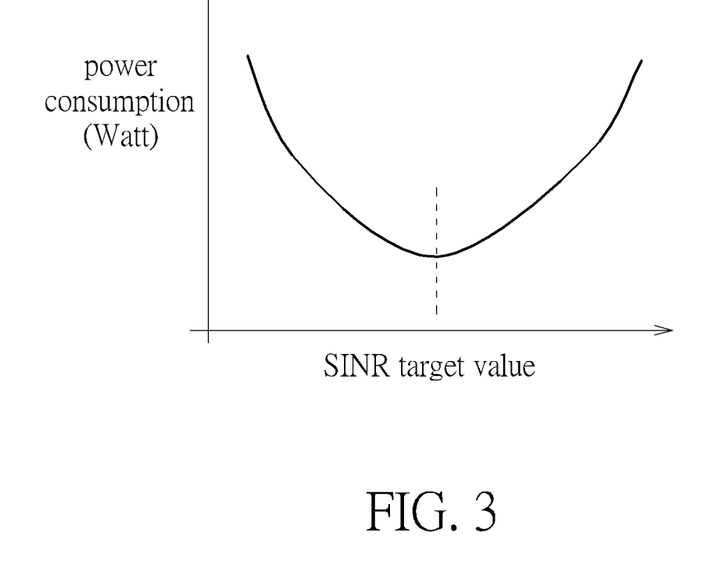
FIG. 3 is a schematic diagram of the relationship between power consumption and SINR target values according to an embodiment of the present invention.
Figure 4:
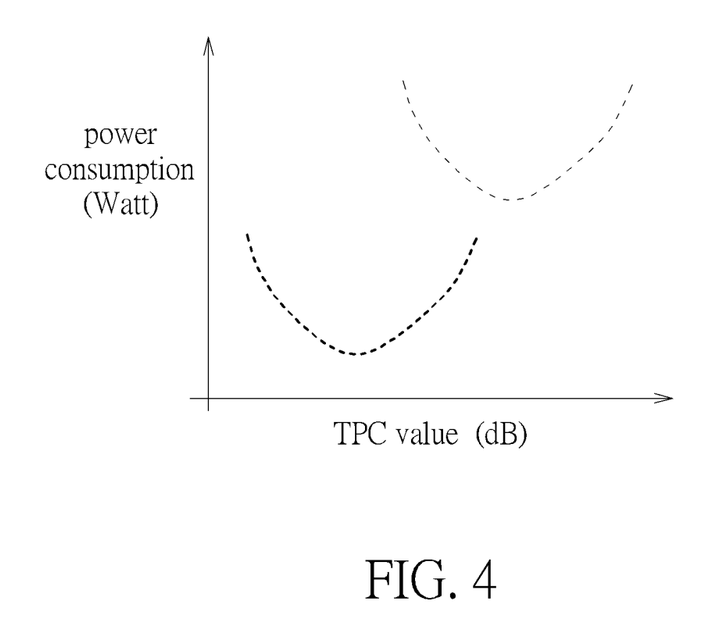
FIG. 4 is a schematic diagram of the relationship between power consumption and transmission power control values of a transmission power control command according to an embodiment of the present invention.

FIG. 2 is a schematic diagram of the relationship between power consumption, SINR target values, and TPC values of TPC commands according to an embodiment of the present invention. FIG. 3 is a schematic diagram of the relationship between power consumption and SINR target values according to an embodiment of the present invention. FIG. 4 is a schematic diagram of the relationship between power consumption and TPC values of TPC commands according to an embodiment of the present invention. In FIG. 4, a thick dashed line indicates/corresponds to a case that the communication devices 120 and 140 are relatively close; a thin dashed line indicates/corresponds to a case that the communication devices 120 and 140 are far apart. As shown in FIG. 2, when the TPC value (which is an absolute value expressed in decibels) and/or the SINR target value is low, there are more retransmissions between the communication devices 120 and 140, and the power consumption of the communication device 120 becomes higher. However, FIG. 2 to FIG. 4 are only for illustration to specify that there are relationships among the power consumption, the SINR target value, and the TPC value, while the expression of the relationship function uef( ) among the power consumption, and the SINR target value, and the TPC value is unknown in most cases.

Figure 5:
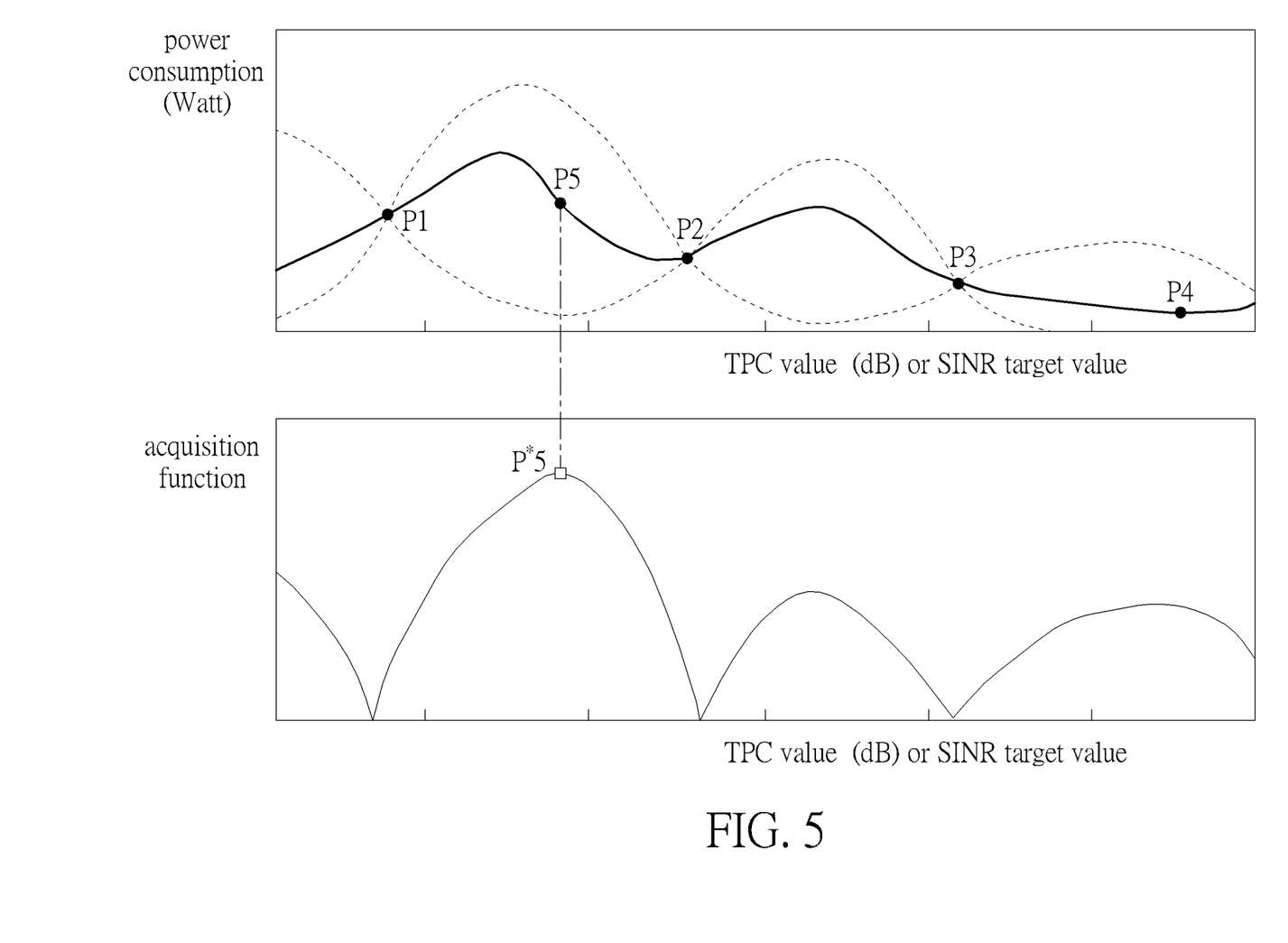
FIG. 5 is a schematic diagram of Bayesian Optimization for a one-dimensional problem according to an embodiment of the present invention.

Since the expression of the relationship function uef( ) is unknown, Bayesian Optimization may roughly fit the relationship function uef( ) using partial/finite sampling points and leverage information of previous sampling point(s) to determine the next sampling point so as to find extremum point(s). For example, FIG. 5 is a schematic diagram of Bayesian Optimization for a one-dimensional problem according to an embodiment of the present invention, where the thick solid line represents estimated function values of the objective function (e.g., power consumption), and the solid black points P1 to P5 respectively represents sampling points which have been found, the area enclosed by two dotted lines represents the fluctuation range (centered on a mean value and proportional to a standard deviation) of the objective function at each point, and the thin solid line represents an acquisition function. The idea of Bayesian Optimization is to first generate an initial candidate solution set (e.g., the power consumption, the SINR target value, or the TPC value corresponding to the solid black point P1), then search for the next sampling point (e.g., the solid black point P2), which may have an extreme value, based on the initial candidate solution set, repeatedly search for the next sampling point (e.g., the solid black points P3-P5), which may have an extreme value, until the iteration terminates, and add all the searched sampling points (e.g., the solid black points P1-P5) to the candidate solution sets. Finally, a (global) extremum point is found from the sampling points of the candidate solution sets as the solution of the problem (e.g., the power consumption, the SINR target value, or the TPC value corresponding to the solid black point P4).

Bayesian Optimization estimates mean value(s) and variance(s) of the true objective function (e.g., power consumption) based on the function values of the sampling points that have been found (e.g., the power consumption corresponding to the solid black point P1) to determine the next sampling point (e.g., the solid black point P2) according to the sampling point already found (e.g., the solid black point P1). The estimated objective function (i.e., the mean values of the objective function at each point) represented by the thick solid line in FIG. 5 passes through the sampling points (e.g., the solid black points P1-P4), and the variance is minimized. The variance is larger when the estimated objective function is far from the sampling point (e.g., the solid black points P1-P4). The acquisition function represented by the thin solid line in FIG. 5 may be constructed according to mean values and variances; that is, the acquisition function may be a function of mean values and variances. The estimation of the possibility that a point (e.g., one of the solid black points P1-P5) is an extremum point of the objective function reflects the degree that the point is worth searching. A relative extremum point of the acquisition function may correspond to the next sampling point of the objective function: for example, the point P*5 represented by the rectangular box in FIG. 5 is the maximum point of the acquisition function and may correspond to the next sampling point (i.e., the solid black point P5) of the objective function (e.g., the power consumption) (according to the SINR target value or the TPC value).

In one embodiment, the power consumption, the SINR target value, and the TPC value corresponding to one of the solid black points P1-P5 may be obtained from the signal Srs in FIG. 1, a power headroom report, other signals received by the communication device 140, 160, or other data internally stored in the communication device 140, 160, but is not limited thereto. In one embodiment, the signal Srs may be a reference signal.

The core of Bayesian Optimization may be divided into two parts: modeling the objective function (i.e., calculating mean values and variances of the objective function at different points, which may be achieved by Gaussian process regression) and constructing the acquisition function (to determine which point is to be processed in certain iteration). In a word, Gaussian process may be used to infer/deduce the power consumption corresponding to an independent variable that has not been configured; that is, power consumption is inferred from Gaussian distribution of inferred mean values and variances.

The algorithm of the present invention may use Gaussian process regression to predict the probability distribution of a function value of the objective function at any point based on the function values of the objective function at a set of sampling points. Gaussian process regression may extend to observations with independent normally distributed noise of known variance. The variance may be unknown, so it may assume that the noise is of common variance and that the noise includes the variance as a hyperparameter. The present invention uses the posterior mean of the Gaussian process that includes noise, which is a drift value rather than the noise of an SINR. In one embodiment, environmental factors such as temperature and humidity or aging processes of components may cause a drift value of power consumption with respect to a certain SINR target value or a certain TPC value.

According to result(s) of Gaussian process regression, an acquisition function (which is used to measure the degree that each point of the objective function is worth exploring) may be constructed to solve a (relative) extremum of the acquisition function so as to determine the next sampling point of the objective function. The acquisition function may be, for example, knowledge gradient (KG), entropy search (ES), or predictive entropy search (PES). Afterwards, the extremum of the objective function of the set of sampling points (which have been found since the beginning) is returned as the extremum of the objective function (e.g., the minimum power consumption in response to the optimal TPC value and the optimal SINR target value). The communication device 140 may provide the communication device 120 with the optimal TPC value and/or the optimal SINR target value.

In one embodiment, the TPC value is an absolute value rather than a relative value (e.g., to instruct to change the current transmission power into an exact transmission power instead of gradually increasing/decreasing the current transmission power by −1, 0, +1, or +3 dB each time). The TPC value (e.g., 20) may be used to directly indicate the communication device 120 which decibels (dB) the transmission power is to be adjusted to (e.g., 20 dB). In other words, compared with fine-tuning the TPC value for the TPC value to converge into an optimal solution in the long term in the prior art, the present invention may directly indicate a better TPC value. The difference between the TPC value and the original transmission power of the communication device 120 may be greater than 3 dB, less than −1 dB, or in a range of −1 dB to 3 dB.

In one embodiment, the algorithm of the present invention may optimize the SINR target value. In other words, SINR target value is dynamic rather than fixed. Since the SNR target value may vary depending on the type of data or the location of the communication device 120, it may not be ideal for the SINR target value to be a fixed value.

In one embodiment, a constraint that is based on a fixed rate (i.e., fixed throughput) may be added to the algorithm (e.g., Bayesian Optimization). That is, the power is controlled in a manner of fixed throughput.

In one embodiment, there may be many independent variables to be considered by the algorithm of the present invention (except the TPC value and the SINR target value). When the spatial dimension grows, the performance of Bayesian Optimization may deteriorate exponentially. Therefore, the algorithm of the present invention may extend to Causal Bayesian Optimization (CBO). In other words, the present invention may use Causal Bayesian Optimization to calculate the optimal/minimum power consumption when the power consumption is related to the SINR target value, the TPC value, and other independent variables.

Figure 6:
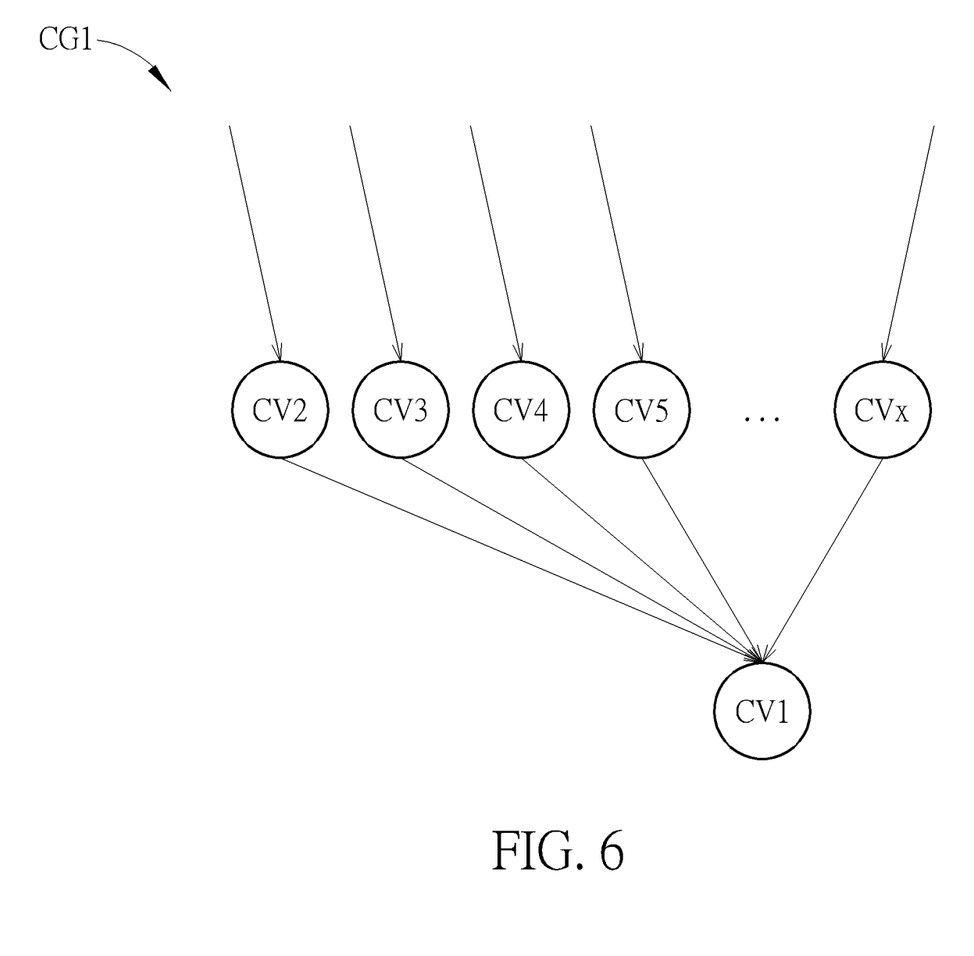
FIG. 6 is a schematic diagram of part of a causal graph according to an embodiment of the present invention.

Specifically, the present invention may find the causal relationship between power consumption, an SINR target value, a TPC value, and/or other independent variables (e.g., a causal graph of power consumption, an SINR target value, a TPC value, and/or other independent variables). Therefore, power consumption, an SINR target value, a TPC value, and other independent variables may be regarded as causal variables. For example, FIG. 6 is a schematic diagram of part of a causal graph CG1 according to an embodiment of the present invention. Causal variables CV1 to CVx constitute the causal graph CG1 used by a causal model, where x is a positive integer. The causal variables CV1-CV3 may represent power consumption, an SINR target value, and a TPC value respectively. As shown in FIG. 6, the causal dimentionality found by Causal Bayesian Optimization may be x−1, so there are x−1 independent variables that are fed into the objective function of Causal Bayesian Optimization (e.g., power consumption) for optimization. Accordingly, the values of x−1 causal variables CV2-CVx that are able to minimize the causal variable CV1 are calculated. The causal graph CG1 may significantly improve the ability to reason about optimal decision making strategies, thereby decreasing optimization cost and avoiding suboptimal solutions.

In one embodiment, a causal model for optimization may be selected based on maximum a posterior (MAP) and point estimation to obtain a causal graph of power consumption, an SINR target value, a TPC value, and other independent variables. Accordingly, causal variables of a causal graph of the causal model (e.g., the number of the causal variables, attributes of a causal variable, the number of the attributes of a causal variable) and a causal structure of the causal graph (e.g., how attributes connect to each other) are determined/found/created together (at a time or in one go). Deciding the causal variables and the causal structure simultaneously/parallelly may avoid problems incurred by deciding first causal variables and then a causal structure.

Figure 7:
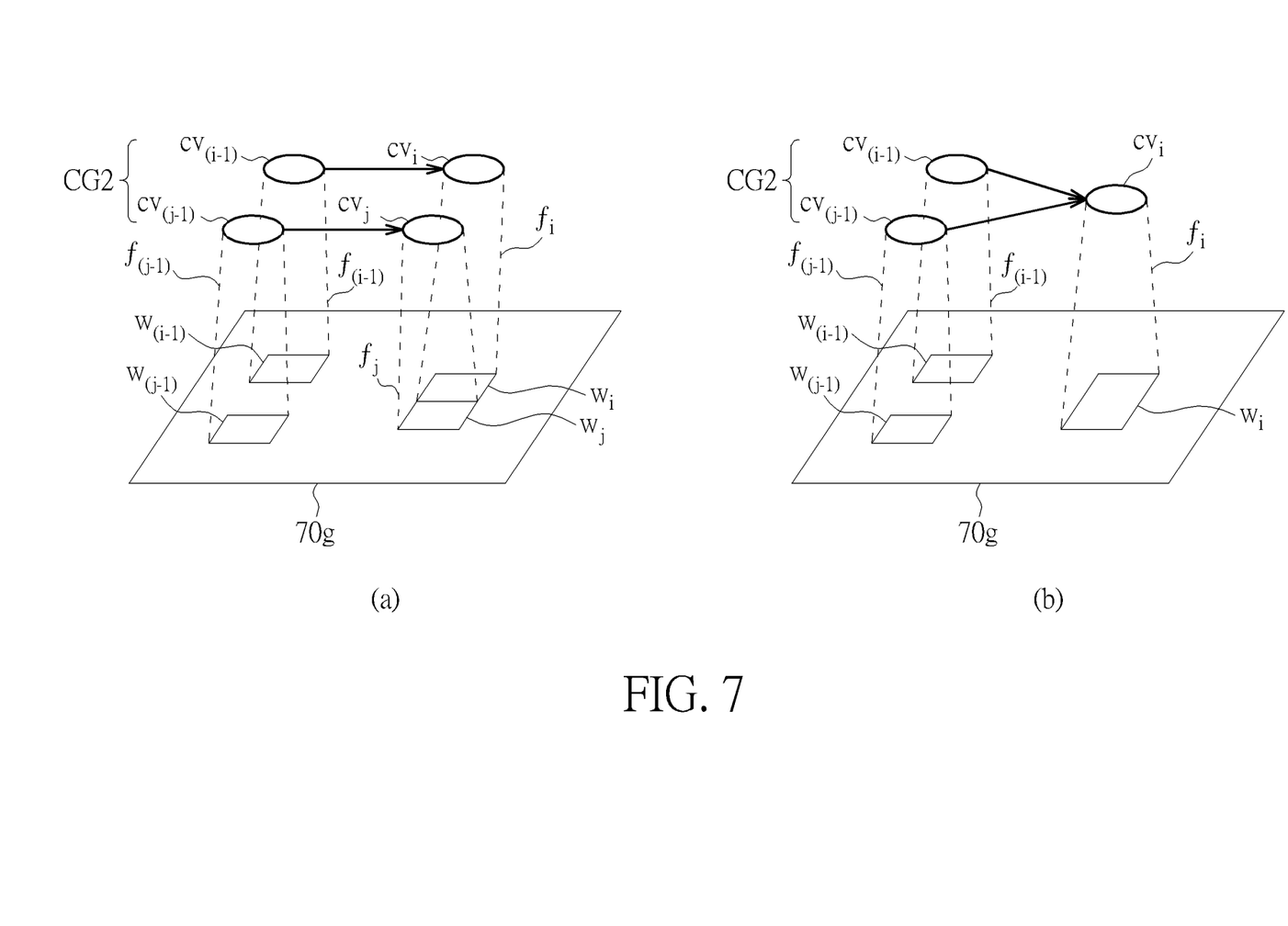
FIG. 7 is a schematic diagram of grounding data and part of a causal graph according to an embodiment of the present invention.

For example, FIG. 7 is a schematic diagram of grounding data 70 g and part of a causal graph CG2 according to an embodiment of the present invention. In FIG. 7, (a) and (b) respectively illustrate two possibilities of the grounding data 70 g and the causal graph CG. The causal graph CG2 may serve as the causal graph CG1. In one embodiment, the grounding data 70 g may be obtained or derived from the space of all observable samples, and thus may be referred to as observation data. In one embodiment, the grounding data 70 g may be obtained or derived from all the data having been collected. In one embodiment, the grounding data 70 g may include or be related to all signals received by the communication device 140 (e.g., the signals Srs or a power headroom report) or sent out by the communication device 140 (e.g., the TPC command Stpc) at any time in any manner.

In FIG. 7, a causal structure of the causal graph CG2 may present the relationship between causal variables (e.g., causal variables $cv_{(i-1)}$, $cv_i$, $cv_{(j-1)}$, and $cv_j$). Observation functions $f_{(i-1)}$, $f_i$, $f_{(j-1)}$, and $f_j$ may be used to map subdata $w_{(i-1)}$, $w_i$, $w_{(j-1)}$, and $w_j$ of the grounding data 70 g to the causal variables $cv_{(i-1)}$, $cv_i$, $cv_{(j-1)}$, and $cv_j$ so as to provide the relationship between the causal variables $cv_{(i-1)}$, $cv_i$, $cv_{(j-1)}$, and $cv_j$ and the subdata $w_{(i-1)}$, $w_i$, $w_{(j-1)}$, and $w_j$ of the grounding data 70 g. Here, i, j are positive integers. The mapping here is on a basis of the corresponding subdata (e.g., the subdata $w_{(i-1)}$, $w_i$, $w_{(j-1)}$, and $w_j$) (e.g., a framed area in FIG. 7) instead of the (whole) grounding data 70 g. For example, if the causal variable $cv_{(i-1)}$ corresponds to the TPC value, the subdata $w_{(i-1)}$ is related to attributes of the causal variable $cv_{(i-1)}$ (for example, the subdata $w_{(i-1)}$ is related to all data to set the absolute value of the TPC value).

In one embodiment, a posterior probability $P(f_i, C|w_i)$ of assigning the subdata $w_i$ of the grounding data 70 g to the observation function $f_i$ and a causal structure C of the causal graph CG may be maximized so as to determine/derive the corresponding causal structure C and the corresponding causal variable $cv_i$ based on the subdata $w_i$ of the grounding data 70 g. Accordingly, inference of the causal model may be described by combining Bayesian network (e.g., for the causal structure) with the observation functions (e.g., the observation functions $f_{(i-1)}, f_i, f_{(j-1)}$, and $f_j$). It is noteworthy that causal variables (e.g., the causal variables $cv_{(i-1)}$, $cv_i$, $cv_{(j-1)}$, and $cv_j$) and the corresponding causal structure (e.g., the causal structure C) of the corresponding causal graph (e.g., the causal graph CG) are obtained/determined together (namely, the causal variables (e.g., $cv_{(i-1)}$, $cv_i$, $cv_{(j-1)}$, and $cv_j$) are learned along/together with the causal structure (e.g., the causal structure C)), so the causal variables (e.g., the causal variables $cv_{(i-1)}$, $cv_i$, $cv_{(j-1)}$, and $cv_j$) and the causal structure (e.g., the causal structure C) may interact/affect/constrain each other.

In one embodiment, the posterior probability $P(f_i, C|w_i, Int)$ may satisfy $P(f_i, C|w_i, Int) \propto P(f_i, C) P(w_i|f_i, C, Int)$ according to the Bayesian rule, where $f_i$ may denote the corresponding observation function, C may denote the corresponding causal structure, $w_i$ may denote part of the grounding data 70 g, and Int may denote intervention. In one embodiment, the posterior probability $P(f_i, C|w_i)$ may be proportional to $P(f_i, C) P(w_i|f_i, C)$ or $\Pi_{t=0}^T P(w_{i,t}|s_{t-1}, C, f_i)^{(T-t)^\gamma}$, where $s_{t-1}$ may denote the state at a time instant t−1, T may denote a current/present time instant, and γ may be 0.5, but is not limited thereto. In one embodiment, $P(w|f_i, C)$ may be $Å_{t=0}^T P(w_{i,t}|s_{t-1}, C, f_i)$. In one embodiment, $P(w_{i,t}|s_{t-1}, C, f_i)$ may be $$\frac{1}{|R_{s_t}|} \Pi_{i=1}^{Ncv} P(s_{i,t}|s_{t-1}, C)$$

$\Sigma_{s_t} P(w_{i,t}|s_t, f_i) \Pi_{i=1}^{Ncv} P(s_{i,t}|s_{t-1}, C)$, where $s_{i,t}$ may denote the state of the causal variable $cv_i$ at a time instant t, Ncv may denote the total number of all causal variables (e.g., including the causal variables $cv_{(i-1)}$, $cv_i$, $cv_{(j-1)}$, and $cv_j$), Ncv is a positive integer, and $R_{s_t}$ may denote the data amount of the subdata $w_i$ which is compatible with the state $s_i$ of the causal variable $cv_i$ within the grounding data 70 g. In one embodiment, the present invention may select/find the causal variable $cv_i$ that minimizes the data amount $R_{s_t}$, such that subdata within the grounding data 70 g which are frequently used (e.g., the subdata $w_i$) may be cut into finer pieces than those which are rarely used.

As set forth above, Bayesian probability mechanism may combine the number of causal variables (e.g., including the causal variables $cv_{(i-1)}$, $cv_i$, $cv_{(j-1)}$, and $cv_j$), states of the causal variables, a causal structure of the causal variables, and observation functions for the causal variables (e.g., including the observation functions $f_{(i-1)}, f_i, f_{(j-1)}$, and $f_j$) and draw relevant joint inferences to explain/interpret the grounding data 70 g, thereby creating the causal graph CG2. The causal variables (e.g., including the causal variables $cv_{(i-1)}$, $cv_i$, $cv_{(j-1)}$, and $cv_j$) of the causal graph CG2 (or the number of the causal variables) and a causal structure (e.g., C) are determined at the same time; therefore, the causal planning module 120P may differentiate (a) from (b) of FIG. 7, and vice versa.

As shown in FIG. 7, each causal variable (e.g., the causal variable $cv_i$) may correspond to an observation function (e.g., the observation function $f_i$). In one embodiment, an observation function (e.g., the observation function $f_i$) may be calculated/derived using a causal semantic generative (CSG) model so as to predict low-dimensional state attributes (e.g., attribute(s) of the state of the causal variable $cv_i$) from high-dimensional environmental variables (e.g., the grounding data 70 g). When causal variables (e.g., $cv_{(i-1)}$, $cv_i$, $cv_{(j-1)}$, and $cv_j$) are manually defined (e.g., by domain expert(s)), each causal variable (e.g., the causal variable $cv_i$) may have a dedicated causal semantic generative observation function to ground the causal variable onto the corresponding subdata (e.g., the subdata $w_i$) (e.g., the framed area in FIG. 7). Moreover, the causal semantic generative model may avoid deeming variation factor(s) cause(s) of a causal variable (e.g., the causal variable $cv_i$), and may correctly determine semantic factor(s) to be the cause(s) of the causal variable. In one embodiment, variation factor(s) and semantic factor(s) may constitute/belong to observation data. In one embodiment, the causal semantic generative model is primarily based on causal invariance principle and involves variational Bayes.

In one embodiment, the observation function $f_i$ may satisfy $s_{i,t} = f_i(w_{i,t})$. In one embodiment, the observation function $f_i$ may be implemented using multivariate Gaussian distribution: for example, the observation function $f_i$ may satisfy $$f_i(w_i, z) = N(\binom{w_i}{z} | \binom{\mu_{w_i}}{\mu_z}, \Sigma).$$

Alternatively, the observation function $f_i$ may be related to $$N(\binom{w_i}{z} | \binom{\mu_{w_i}}{\mu_z}, \Sigma),$$

where z may denote subdata (which does not contribute to the causal variable $cv_i$) within the grounding data 70 g, $\mu_{w_i}$, $\mu_v$ may denote means fixed as zero vectors, $\Sigma$ may be parameterized by Cholesky decomposition to satisfy, for example, $\Sigma = LL^T$. The matrix L may be a lower-triangular matrix with positive diagonals and may, for example, be parameterized to satisfy $$L = \begin{pmatrix} L_{w_i w_i} & 0 \\ M_{z w_i} & L_{zz} \end{pmatrix}.$$

Each of the matrixes $L_{w_i w_i}$, $L_{zz}$ may be smaller lower triangular matrixes. The matrix $M_{z w_i}$ may be any arbitrary matrix. Each of the matrixes $L_{w_i w_i}$, $L_{zz}$ may be parameterized by a summation of positive diagonal elements (guaranteed via an exponential map) and a lower triangular matrix (without positive diagonal elements).

Figure 8:
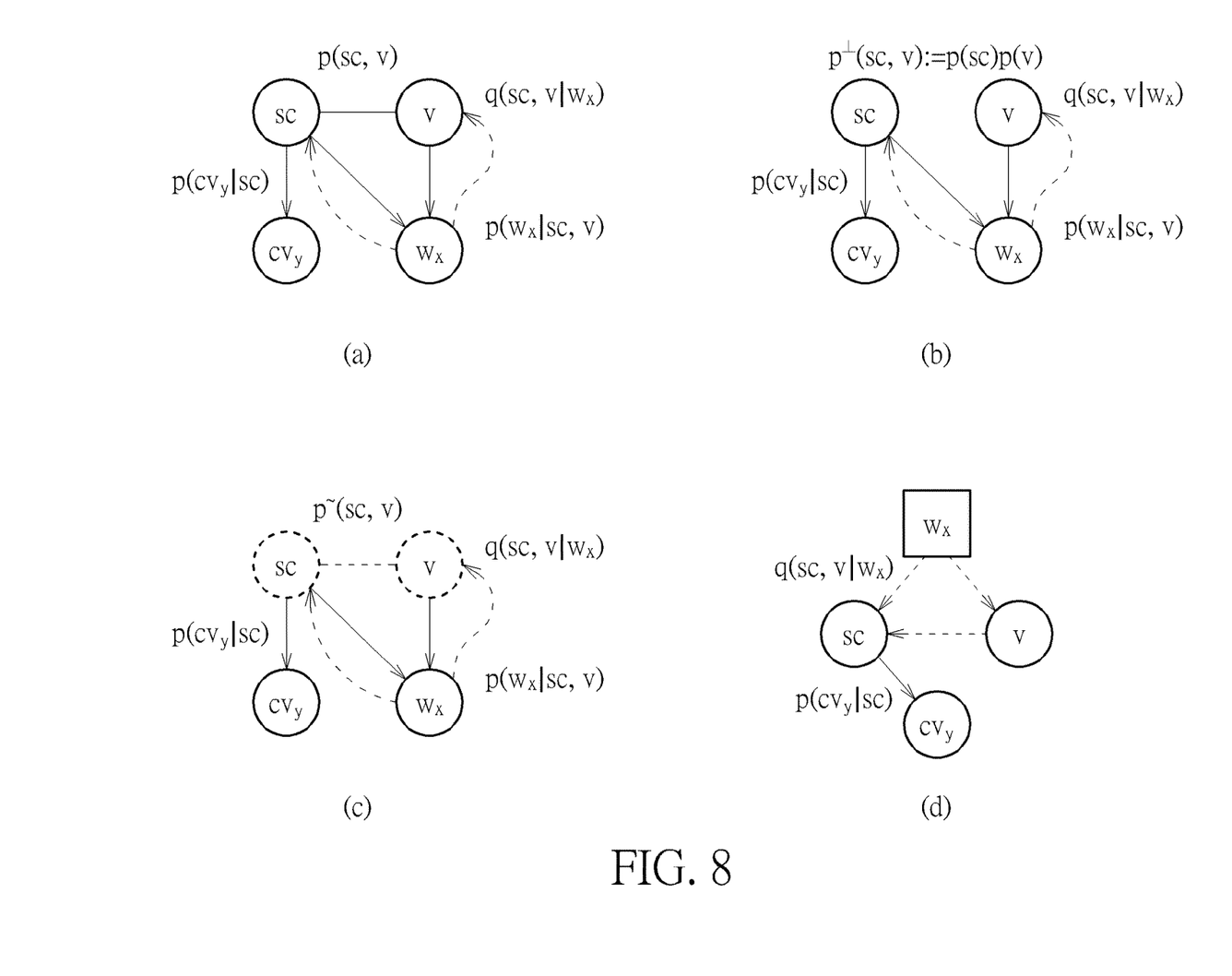
FIG. 8 is a schematic diagram of a causal variable $cv_y$ and subdata $w_x$ according to an embodiment of the present invention.

In one embodiment, the relationship between causal variables (e.g., the causal variable $cv_i$) and subdata (e.g., the subdata $w_i$) may be unknown, but the causal variables may be predicted/inferred from the subdata using a causal semantic generative model. For example, FIG. 8 is a schematic diagram of a causal variable $cv_y$ and subdata $w_x$ according to an embodiment of the present invention, where (a), (b), (c), and (d) respectively illustrate structure possibilities of the causal semantic generative model, sc may represent a semantic factor, v may represent a variation factor, solid arrows may represent causal mechanisms $p(w_x|sc, v)$ and $p(cv_y|sc)$, dashed arrows may represent inference models $q(sc, v|w_x)$ for learning. In (a) of FIG. 8, a solid undirected line between the semantic factor sc and the variation factor v may represent a domain-specific prior $p(sc, v)$. Compared with the solid undirected line between the semantic factor sc and the variation factor v in (a) of FIG. 8, (b) of FIG. 8 introduces an independent prior $p^\perp(sc, v) = p(sc)p(v)$ to reflect intervention so as to improve out-of-distribution generalization performance. Compared with the solid undirected line between the semantic factor sc and the variation factor v in (a) of FIG. 8, (c) of FIG. 8 introduces a prior p~(sc, v) presented by a dotted line between the semantic factor sc and the variation factor v to reflect intervention according to causal invariance principle so as to leverage unsupervised data. In one embodiment, the present invention may fit the causal semantic generative model p=<p(sc, v), p($w_x$|sc, v), p($cv_y$|sc)> to subdata by maximizing likelihood, perform calculation using variational inference and evidence lower bound (ELBO), and use Monte Carlo to estimate expectations after applying reparameterization tricks.

In one embodiment, Causal Bayesian Optimization may perform optimization only for causal variables directly related to power consumption (e.g., the causal variables CV2-CVx in causal graph CG1, which directly point to or affect the causal variable CV1, which may serve as power consumption). In other words, the causal intrinsic dimensionality of Causal Bayesian Optimization is given by the number of the causal variables CV2-CVx, which are causes/parents of the causal variable CV1, rather than the number of causal variables which are causes of the causal variables CV2-CVx.

In one embodiment, causal variables (e.g., the causal variables CV2-CVx or $cv_{(i-1)}$, $cv_i$, $cv_{(j-1)}$, $cv_j$) are manually defined (e.g., by domain expert(s)). For example, causal variables are defined by domain experts (nonautomatically and individually); alternatively, causal variables are defined automatically using a program with rules described by domain experts. In one embodiment, subdata (e.g., the subdata $w_{(i-1)}$, $w_i$, $w_{(j-1)}$, and $w_j$ corresponding to the framed area in FIG. 7) are defined/determined according to the definition of specific causal variables by domain experts.

Causal Bayesian Optimization treats causal variables being output (e.g., the causal variable CV1) and causal variables being input (e.g., the causal variables CV2-CVx) as invariant independent variables, and disregards the existence of a temporal evolution in both the causal variables being output and the causal variables being input (i.e., whether the causal variables being output and the causal variables being input change over time), and thus breaks the time dependency structure existing among causal variables. While disregarding time may significantly simplify the problem, it prevents the identification of an optimal intervention at every time instant, and (especially in a non-stationary scenario) may lead to a sub-optimal solution instead of providing the current optimal solution at any time instant. Thus, the present invention may extend to Dynamic Causal Bayesian Optimization, which is useful in scenarios where all causal effects in a causal graph vary over time.

Figure 9:
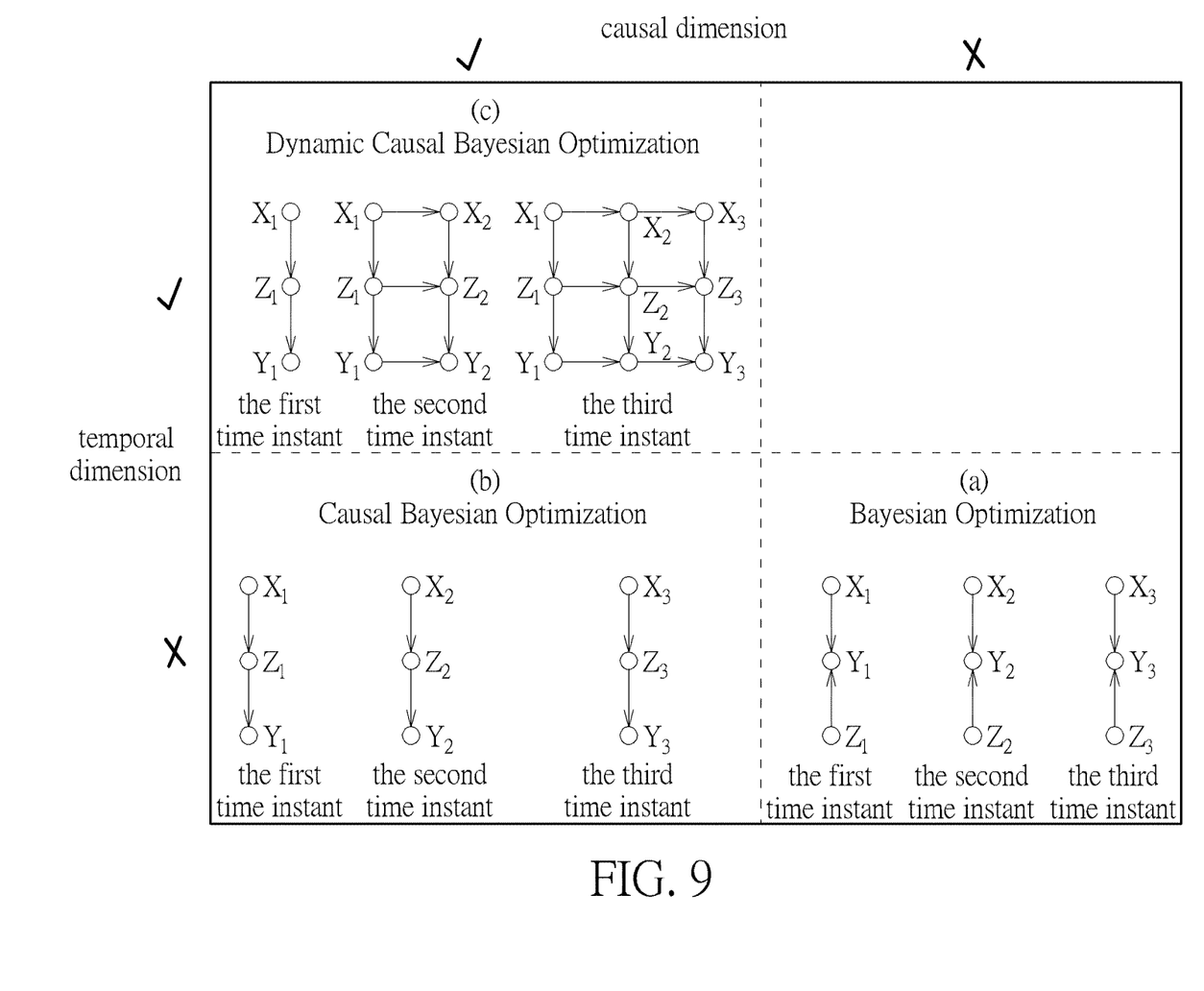
FIG. 9 is a schematic diagram of Bayesian Optimization, Causal Bayesian Optimization, and Dynamic Causal Bayesian Optimization.

For example, FIG. 9 is a schematic diagram of Bayesian Optimization, Causal Bayesian Optimization, and Dynamic Causal Bayesian Optimization. In FIG. 9, $X_1$ to $X_3$ represent a causal variable at three different time instants. $Y_1$ to $Y_3$ represent another causal variable at three different time instants. $Z_1$ to $Z_3$ represent the other causal variable at three different time instants. However, the present invention is not limited thereto and may extend to more different time instants or more causal variables. Dynamic Causal Bayesian Optimization combines Bayesian Optimization and Causal Bayesian Optimization to account for the causal relationships among causal variables, and the causal relationship may evolve over time. For example, in Dynamic Causal Bayesian Optimization, as shown in FIG. 9, the causal variable $Y_1$ at the first time instant is a function of the causal variable $Z_1$ at the first time instant; therefore, the minimum value of the causal variable $Y_1$ (which may represent or correspond to power consumption) may be found by using only the causal variable $Z_1$, which is directly related to the causal variable $Y_1$, and the causal intrinsic dimensionality is 1. Similarly, the causal variable $Y_2$ at the second time instant is a function of the causal variable $Z_2$ at the second time instant and the causal variable $Y_1$ at the first time instant; therefore, the minimum value of the causal variable $Y_2$ (which may represent or correspond to power consumption) may be found by using only the causal variable $Y_1$ and $Z_2$, which are directly related to the causal variable $Y_2$, and the causal intrinsic dimensionality is 2. Similarly, the causal variable $Y_3$ at the third time instant is a function of the causal variable $Z_3$ at the third time instant and the causal variable $Y_2$ at the second time instant; therefore, the minimum value of the causal variable $Y_3$ (which may represent or correspond to power consumption) may be found by using only the causal variable $Y_2$ and $Z_3$, which are directly related to the causal variable $Y_3$, and the causal intrinsic dimensionality is 2. In other words, a causal variable serving as a dependent variable at a time instant is a function of causal variable(s) at previous time instant(s) (serving either as dependent or independent variable(s)), and therefore the minimum value of the former (i.e., a causal variable serving as a dependent variable at a certain time instant) may be found by using only the latter directly related to the former (i.e., causal variable(s) serving either as dependent or independent variable(s) at previous time instant(s)).

In one embodiment, the communication system 10 may be utilized to perform communications for downlinks. The communication device 140 may be a radio unit (RU). The communication device 120 may be a customer-premises equipment (CPE). The communication device 160 may be a distributed unit (DU). However, the present invention is not limited thereto.

Alternatively, the communication device 140 may be a base station such as a node B, an evolved-node B (eNB), a next generation-node B (gNB), a sector, a base transceiver system (BTS), an access point (AP), a relay node, a remote radio head (RRH), a small cell, a base station controller (BSC), or a fixed station that exchange data and control information with a user equipment (UE) or another base station. The communication device 120 may be a UE such as a terminal equipment, a mobile station (MS), or a fixed or mobile device. In other words, the TPC command Stpc may be sent from the base station to the user equipment to control the power of the user equipment, which belongs to a forward link.

In one embodiment, the communication system 10 may be utilized to perform communications for uplinks. The communication device 140 may be a customer-premises equipment and the communication device 120 may be a radio unit. However, the present invention is not limited thereto. The communication device 140 may be a UE, and the communication device 120 may be a base station. The communication device 160 may be removed or omitted. In other words, the TPC command Stpc may be sent from the UE to the base station to control the power of the base station, which belongs to a reverse link.

Figure 10:
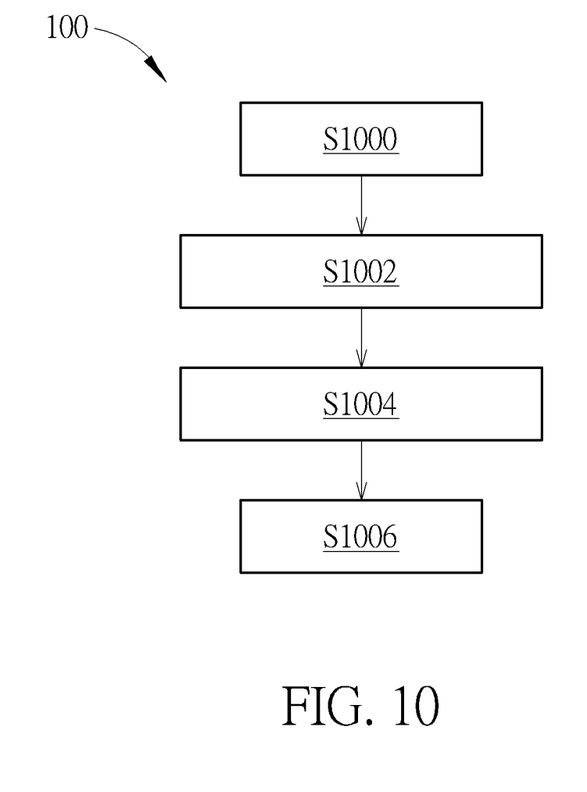
FIG. 10 is a flowchart of a communication method according to an embodiment of the present invention.

FIG. 10 is a flowchart of a communication method 100 according to an embodiment of the present invention. The communication method 100 is available to the communication device 140 or 160. The communication method 100 may be compiled into a code, which may be executed by a processing circuit and stored in a storage circuit. The steps of the communication method 100 may include the following steps:

Step S1000: Start.

Step S1002: Apply Bayesian Optimization, Causal Bayesian Optimization, or Dynamic Causal Bayesian Optimization to at least one data so as to determine a TPC value, wherein the at least one data is extracted from at least one signal at least from a communication device 120 (e.g., the signal Srs or the power headroom report, but not limited thereto).

Step S1004: Output the TPC value, wherein the TPC value is configured to instruct the communication device 120 how to set the transmission power of the communication device 120.

Step S1006: End.

In one embodiment, the storage circuit is configured to store image data or instructions. The storage circuit may be a subscriber identity module (SIM), a read-only memory (ROM), a flash memory, a random access memory (RAM), a disc read-only memory (CD-ROM/DVD-ROM/BD-ROM), a hard disk, an optical data storage device, a non-volatile storage device, a non-transitory computer-readable medium, but is not limited thereto.

In one embodiment, the processing circuit is configured to execute instructions (stored in the storage circuit). The processing circuit may be a microprocessor, or an application-specific integrated circuit (ASIC), but is not limited thereto.

To sum up, the present invention may use Bayesian Optimization to select optimal value(s) of independent variable (e.g., a TPC value of a TPC command and/or an SINR target value) to achieve minimum power consumption and deal with fast-moving communication device(s) (to ensure Quality of Service (QoS)) at any time instance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control method, for a first communication device, comprising:
   applying Bayesian Optimization, Causal Bayesian Optimization, or Dynamic Causal Bayesian Optimization to at least one data to search for a plurality of independent variable optimal values together from at least one independent variable so as to determine a transmission power control (TPC) value, wherein the at least one data is extracted from at least one signal at least from a second communication device, wherein the plurality of independent variable optimal values comprises the TPC value; and
   outputting the TPC value, wherein the TPC value is configured to instruct the second communication device how to set transmission power of the second communication device;
   wherein a causal structure of a causal graph, which is configured for a power consumption of the second communication device and the at least one independent variable, and a plurality of causal variables of the causal graph are determined together.

2. The power control method of claim 1, further comprising:
   outputting a signal-to-interference-plus-noise ratio (SINR) target value, wherein the Bayesian Optimization, the Causal Bayesian Optimization, or the Dynamic Causal Bayesian Optimization is applied to the at least one data to determine the TPC value and the SINR target value together.

3. The power control method of claim 1, wherein a constraint based on fixed throughput is added to the Bayesian Optimization, the Causal Bayesian Optimization, or the Dynamic Causal Bayesian Optimization.

4. The power control method of claim 1, wherein the plurality of independent variable optimal values comprises the TPC value, an SINR target value, and at least one first independent variable optimal value.

5. The power control method of claim 1, wherein the causal graph is generated based on maximum a posteriori and point estimation.

6. The power control method of claim 1, wherein a plurality of subdata in a grounding data is mapped to the plurality of causal variables of the causal graph by using a plurality of observation functions, to generate the causal graph from the grounding data based on maximum a posteriori and point estimation.

7. The power control method of claim 6, wherein the plurality of observation functions are obtained based on a causal semantic generative model.

8. The power control method of claim 1, wherein second power consumption corresponding to the second communication device at a second time instant is a function of the at least one independent variable at the second time instant, the at least one independent variable at a first time instant, or a first power consumption corresponding to the second communication device at the first time instant.

9. The power control method of claim 1, wherein the first communication device is one of a distribution unit and a user equipment, and the second communication device is the other of the distribution unit and the user equipment.

10. A communication device, comprising:
    a storage circuit, configured to store instructions of:
       applying Bayesian Optimization, Causal Bayesian Optimization, or Dynamic Causal Bayesian Optimization to at least one data to search for a plurality of independent variable optimal values together from at least one independent variable so as to determine a transmission power control (TPC) value, wherein the at least one data is extracted from at least one signal at least from a second communication device, wherein the plurality of independent variable optimal values comprises the TPC value; and
       outputting the TPC value, wherein the TPC value is configured to instruct the second communication device how to set transmission power of the second communication device; and
    a processing circuit, coupled to the storage circuit, configured to execute the instructions stored in the storage circuit;
    wherein a causal structure of a causal graph, which is configured for a power consumption of the second communication device and the at least one independent variable, and a plurality of causal variables of the causal graph are determined together.

11. The communication device of claim 10, wherein the instructions further comprises:
    outputting a signal-to-interference-plus-noise ratio (SINR) target value, wherein the Bayesian Optimization, the Causal Bayesian Optimization, or the Dynamic Causal Bayesian Optimization is applied to the at least one data to determine the TPC value and the SINR target value together.

12. The communication device of claim 10, wherein a constraint based on fixed throughput is added to the Bayesian Optimization, the Causal Bayesian Optimization, or the Dynamic Causal Bayesian Optimization.

13. The communication device of claim 10, wherein the plurality of independent variable optimal values comprises the TPC value, an SINR target value, and at least one first independent variable optimal value.

14. The communication device of claim 10, wherein the causal graph is generated based on maximum a posteriori and point estimation.

15. The communication device of claim 10, wherein a plurality of subdata in a grounding data is mapped to the plurality of causal variables of the causal graph by using a plurality of observation functions, to generate the causal graph from the grounding data based on maximum a posteriori and point estimation.

16. The communication device of claim 15, wherein the plurality of observation functions are obtained based on a causal semantic generative model.

17. The communication device of claim 10, wherein a second power consumption corresponding to the second communication device at a second time instant is a function of the at least one independent variable at the second time instant, the at least one independent variable at a first time instant, or a first power consumption corresponding to the second communication device at the first time instant.

18. The communication device of claim 10, wherein the first communication device is one of a distribution unit and a user equipment, and the second communication device is the other of the distribution unit and the user equipment.

* * * * *